(12) United States Patent
Ratajski et al.

(10) Patent No.: US 7,441,832 B2
(45) Date of Patent: Oct. 28, 2008

(54) PNEUMATICALLY REINFORCED VEHICLE BODY STRUCTURE

(75) Inventors: Daniel James Ratajski, Livonia, MI (US); William Blackbird, Jr., Chesterfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/566,329

(22) Filed: Dec. 4, 2006

(65) Prior Publication Data

US 2008/0129025 A1 Jun. 5, 2008

(51) Int. Cl.
*B60R 21/213* (2006.01)

(52) U.S. Cl. .................. 296/212; 296/187.06

(58) Field of Classification Search ............ 296/187.06, 296/212; 293/110, 107
See application file for complete search history.

(56) References Cited

U.S. PATENT DOCUMENTS

| | | | | |
|---|---|---|---|---|
| 4,995,659 A | * | 2/1991 | Park .......................... 293/107 |
| 5,106,137 A | * | 4/1992 | Curtis ......................... 293/107 |
| 5,542,698 A | * | 8/1996 | Ichino et al. ................. 280/732 |
| 5,732,785 A | | 3/1998 | Ran et al. |
| 5,775,726 A | | 7/1998 | Timothy et al. |
| 5,810,427 A | * | 9/1998 | Hartmann et al. ....... 296/187.03 |
| 6,273,465 B1 | * | 8/2001 | Cress ......................... 280/748 |
| 6,341,813 B1 | * | 1/2002 | Taghaddos ............. 296/187.06 |
| 6,375,251 B1 | * | 4/2002 | Taghaddos ............. 296/187.03 |
| 6,523,887 B1 | | 2/2003 | Picken et al. |
| 6,529,811 B2 | * | 3/2003 | Watson et al. ................. 701/45 |
| 6,588,793 B2 | | 7/2003 | Rose |
| 6,733,034 B2 | * | 5/2004 | Tiesler .................... 280/730.1 |

\* cited by examiner

*Primary Examiner*—Dennis H. Pedder
*Assistant Examiner*—Mike Hernandez
(74) *Attorney, Agent, or Firm*—Dickinson Wright PLLC; Greg Brown

(57) ABSTRACT

A pneumatic reinforcement system (14) ("system") for a body structure (12) of a vehicle (10) includes an air bladder (28), an inflator device (30), a sensor (32), and one or more mounting members (34*a*, 34*b*, 34*c*). The sensor (32) detects a crash condition and actuates the inflator device (30) to inflate the air bladder (28). The air bladder (28) is attached to the body structure (12) by mounting members (34*a*, 34*b*, 34*c*), with the inflated air bladder (28) and mounting member (34*a*, 34*b*, 34*c*) strengthening the body structure (12) during a crash condition.

10 Claims, 3 Drawing Sheets

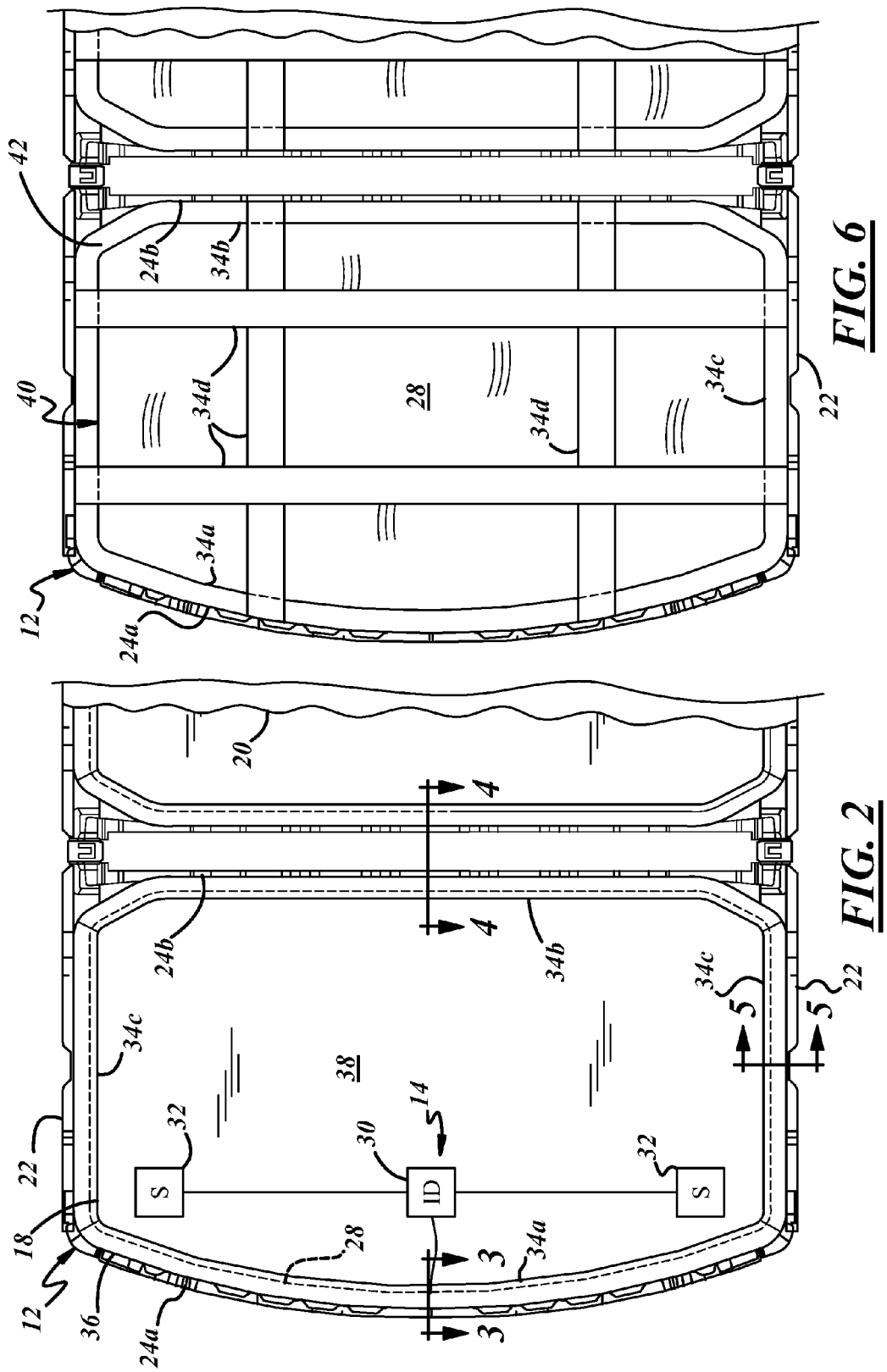

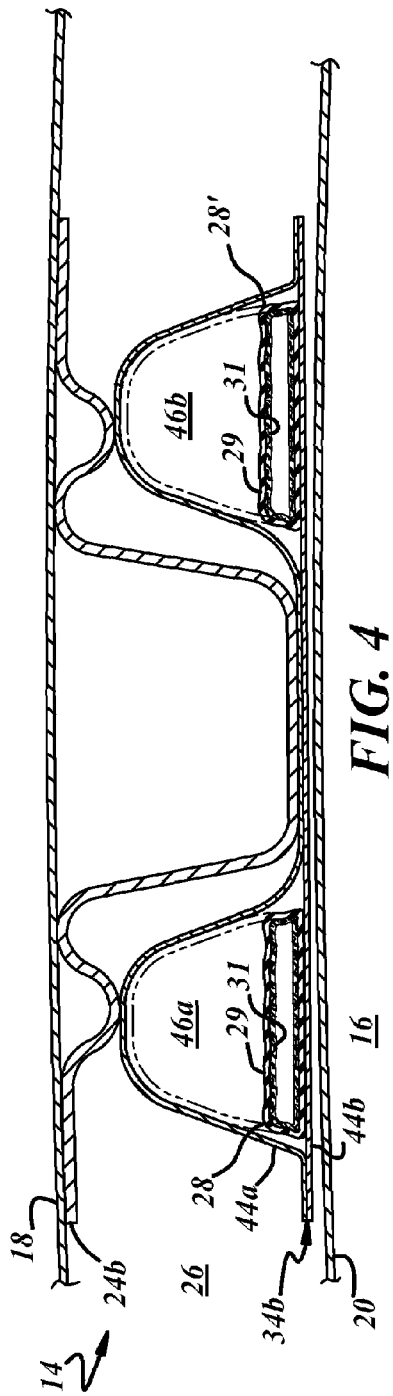
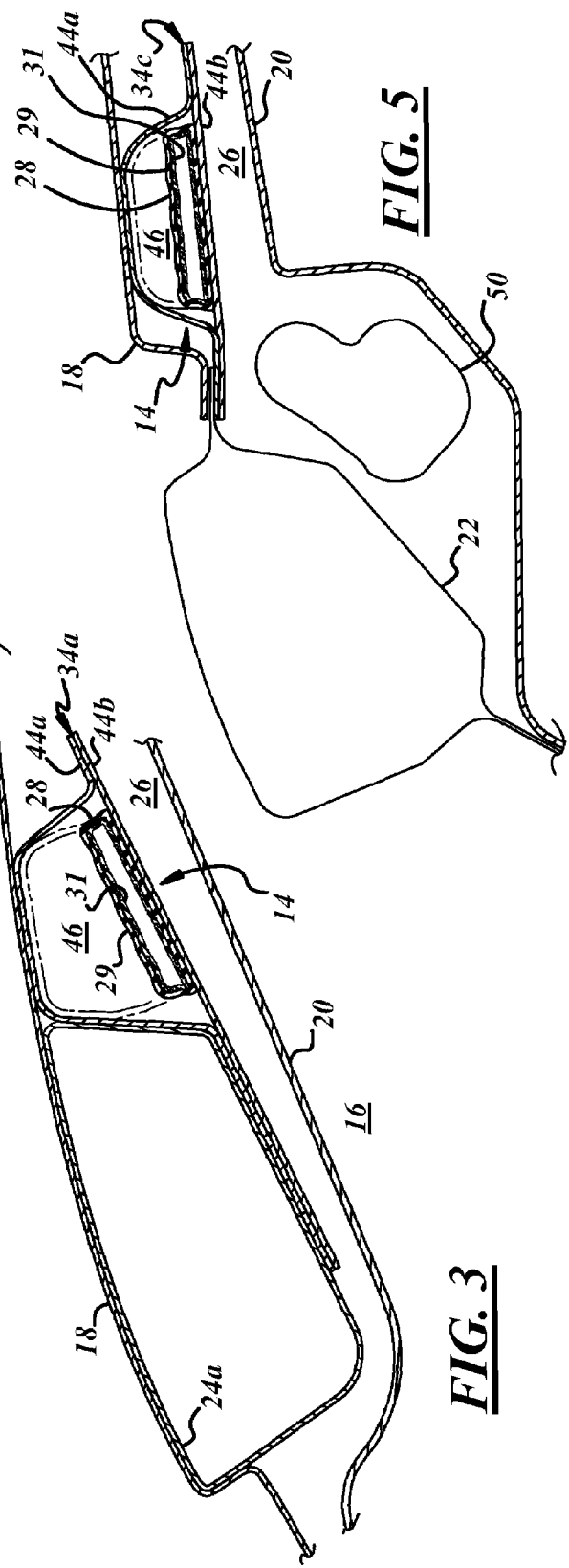

PNEUMATICALLY REINFORCED VEHICLE BODY STRUCTURE

TECHNICAL FIELD

The present invention relates generally to vehicle body structures, and more particularly to a pneumatic reinforcement system that prevents intrusion into a passenger cabin.

BACKGROUND

Automotive manufacturers are investigating fixed reinforcement structures that minimize roof intrusion during roll over crashes. One known vehicle roof is reinforced with boron steel, which typically has sufficient strength for preventing roof intrusion. However, boron steel is a high-strength alloy that is so hard that special tools are required to form the alloy. For that reason, the roof structure can have somewhat high manufacturing costs. It will also be appreciated that a roof reinforced with high-strength steel can have high costs and add significant weight to the vehicle.

Existing vehicles include supplemental/secondary restraint systems ("SRS") with rapidly inflating airbags that cushion vehicle occupants during a collision. The airbags typically deploy into the passenger cabin from a steering wheel, instrument panel, seatback, or door. However, the airbags typically do not reinforce the vehicle body and minimize intrusion into the passenger cabin.

It is therefore desirable to provide a pneumatic reinforcement system that decreases intrusion into the passenger cabin and minimizes overall vehicle weight with low manufacturing costs.

SUMMARY OF THE INVENTION

A pneumatic reinforcement system ("system") for a vehicle body structure is provided. The system includes an air bladder, an inflation device, a sensor, and a mounting member. The sensor detects a crash condition and actuates the inflator device to inflate the air bladder. The air bladder is attached to the vehicle body structure by the mounting member, with the inflated air bladder and mounting member strengthening the vehicle body structure during the crash condition.

One advantage of the invention is that a system is provided that reinforces a vehicle body structure and decreases intrusion into a passenger cabin.

Another advantage of the invention is that a system is provided that reinforces a vehicle body structure at lower manufacturing costs, as compared with conventional reinforcement structures.

Yet another advantage of the invention is that a system is provided that can readily be integrated into existing vehicle body structures.

Still another advantage of the invention is that a system is provided that reinforces a vehicle body structure and minimizes overall vehicle weight, as compared with conventional roof reinforcement structures.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 2 is a cutaway bottom view of the roof shown in FIG. 1;

FIG. 3 is a cross-sectional view of the roof shown in FIG. 2, as taken along line 3-3, illustrating an air bladder reinforcing the roof adjacent to a front cross member;

FIG. 4 is a cross-sectional view of the roof shown in FIG. 2, as taken along line 4-4, illustrating an air bladder reinforcing the roof adjacent to an intermediate cross member;

FIG. 5 is a cross-sectional view of the roof shown in FIG. 2, as taken along line 5-5, illustrating an air bladder reinforcing the roof adjacent to a side rail; and FIG. 6 is a cutaway bottom view of the roof shown in FIG. 1, according to another embodiment of the invention.

DETAILED DESCRIPTION OF THE INVENTION

Figure 1:
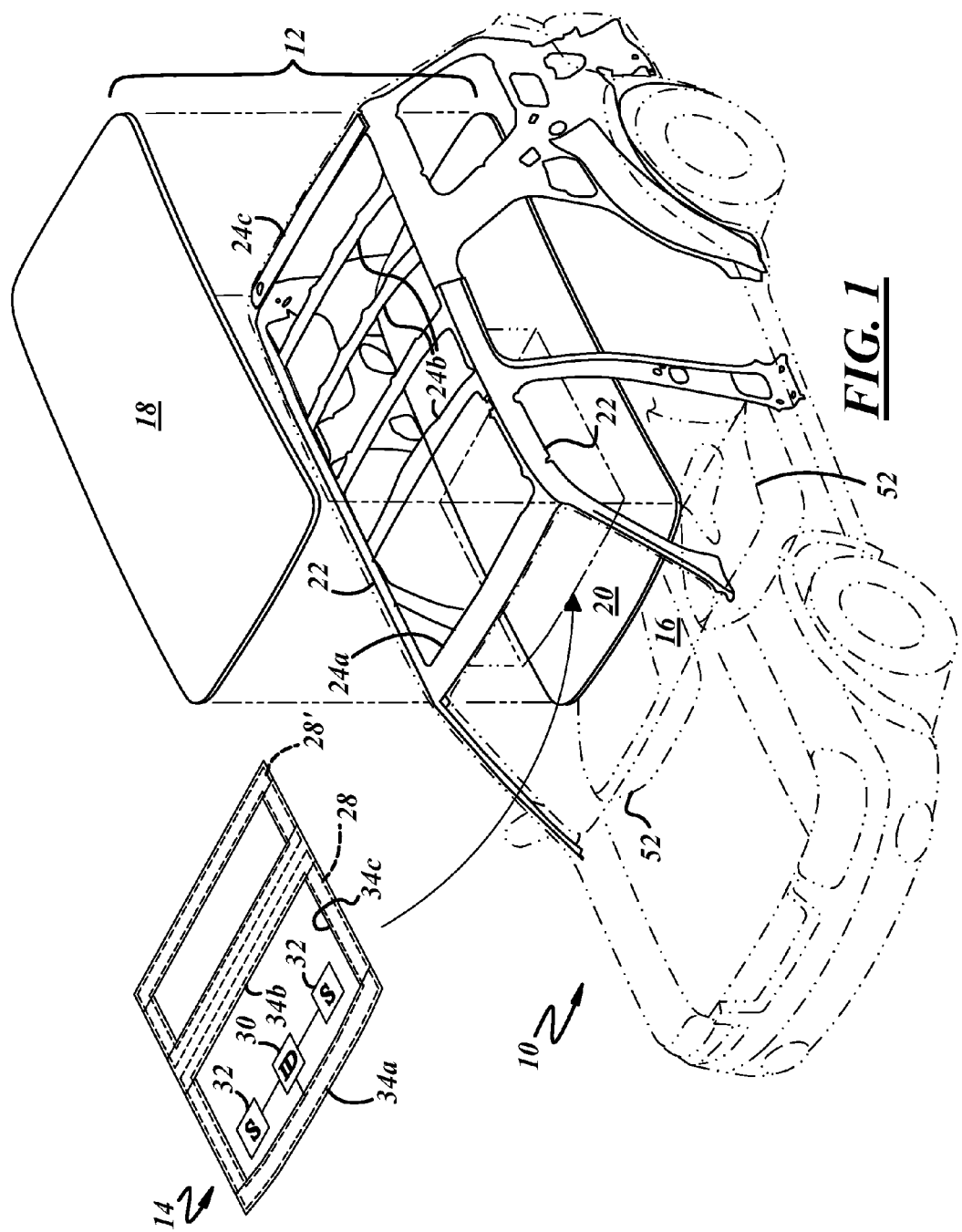
FIG. 1 is a perspective exploded view of a vehicle having a roof with a pneumatic reinforcement system, according to one embodiment of the invention.

In the following figures, the same reference numerals are used to identify the same components in the various views.

Referring to FIG. 1, there is shown a perspective view of a vehicle 10 having a roof 12 with a pneumatic reinforcement system 14 ("system"), according to one embodiment of the claimed invention. The system 14 is beneficial for reducing roof intrusion into a passenger cabin 16, minimizing overall vehicle weight, and decreasing manufacturing costs, as compared with conventional reinforced roof structures. It is contemplated that the system 14 can be utilized for strengthening various other vehicle body structures.

The roof 12 includes an outer roof panel 18, an inner liner panel 20, a pair of opposing side rails 22, a front cross member 24a, one or more intermediate cross members 24b, and a rear cross member 24c. The side rails 22 extend longitudinally along the vehicle 10, with the cross members 24a, 24b, 24c extending laterally between the side rails 22. Outer roof panel 18 is welded or otherwise suitably attached to the side rails 22 and cross members 24a, 24b, 24c. Inner liner panel 20 is attached to the side rails 22, with a cavity 26 (best shown in FIGS. 3 through 5) defined by the inner liner panel 20 and outer roof panel 18. Inner liner panel 20 extends across the passenger cabin 16 and separates the cavity 26 and the passenger cabin 16. The system 14 is positioned within the cavity 26 for strengthening the roof 12. It is contemplated that roof 12 can have other suitable constructions with the parts detached from each other and mounted to various other suitable body structures.

With attention to FIG. 2, there is shown a cutaway bottom view of the roof 12 shown in FIG. 1. The system 14 includes an air bladder 28, an inflator device 30, one or more sensors 32, and one or more mounting members 34a, 34b, 34c. As detailed below, in operation, the sensors 32 detect a collision and actuate the inflator device 30 to inflate air bladder 28 at a substantially high pressure so as to reinforce the roof 12. In the illustrated embodiment, the sensors 32 are angular rate sensors that detect a rollover crash. However, it is contemplated that the sensors 32 can instead be accelerometers positioned in the cavity 26 or otherwise suitably located for detecting a variety of roof collisions. For instance, the sensors 32 can be utilized for detecting a roof collision caused by falling debris from a bridge overpass.

As shown in FIGS. 3 through 5, air bladder 28 has a sufficiently robust construction for inflating at a substantially high pressure, e.g. 150 psi, and assisting the roof 12 in supporting up to 70 tons of load. To that end, the air bladder 28 is formed from neoprene 29 reinforced with one or more layers of aramid cord 31. It is contemplated that the air bladder 28 can be formed from various suitable materials. Furthermore, it is understood that air bladder 28 can inflate at other suitable pressures and support more or less than 70 tons of load. The inflated air bladder 28 is sized for inflating within the cavity 26 up to the height of the cavity 26. In this way, air bladder 28 remains within the cavity 26 and does not intrude into the passenger cabin 16 through the inner liner panel 20.

Referring back to FIG. 2, air bladder 28 has an elongated construction 36 extending around a center portion 38 of outer roof panel 18 defined between the side rails 22 and two adjacent cross members 24a, 24b. However, it is contemplated that the air bladder 28 can have a variety of other suitable constructions for supporting various vehicle body structures. As exemplified in the embodiment shown in FIG. 6, air bladder 28 can have a polygon construction 40 extending substantially across a predetermined surface area 42 of center portion 38 with one or more mounting members 34d supporting the same. It is understood that the enlarged air bladder 28 reinforces a larger surface area of outer roof panel 18, as compared with the elongated air bladder (shown in FIG. 2) that supports a perimeter of outer roof panel 18. The enlarged air bladder 28 is positioned above a first row of passenger seats 52 (shown in FIG. 1) for protecting the same. However, the air bladder 28 can be located in various locations.

With attention to FIG. 3, air bladder 28 is attached to a front cross member 24a by mounting member 34a. In this embodiment, mounting member 34a includes a first housing portion 44a and a second housing portion 44b, which define a chamber 46 containing the air bladder 28. First housing portion 44a is welded or otherwise suitably attached directly to front cross member 24a and outer roof panel 18. Second housing portion 44b is welded or otherwise suitably attached directly to first housing portion 44a. In this regard, during a crash condition, inflated air bladder 28 and mounting member 34a reinforce front cross member 24a and outer roof panel 18.

Referring to FIG. 4, air bladder 28 is attached to an intermediate cross member 24b by mounting member 34b. In the illustrated embodiment, mounting member 34b includes a first housing portion 44a and a second housing portion 44b, which define two chambers 46a, 46b positioned forward and aft of intermediate cross member 24b. In this regard, mounting member 34b can attach two air bladders 28, 28' to intermediate cross member 24b forward and aft of the same. First housing portion 44a is welded or otherwise suitably attached directly to intermediate cross member 24b. Second housing portion 44b is welded or otherwise suitably attached directly to the first housing portion 44a. In this respect, during a crash condition, inflated air bladders 28, 28' and mounting member 34b reinforce intermediate cross member 24b and outer roof panel 18.

As shown in FIG. 5, air bladder 28 is attached to side rail 22 and outer roof panel 18 by mounting member 34c formed from first housing portion 44a and second housing portion 44b. First and second housing portions 44a, 44b define a chamber 46 containing air bladder 28. First housing portion 44a is welded or otherwise suitably attached to side rail 22 and outer roof panel 18. Second housing portion 44b is welded or otherwise suitably attached to first housing portion 44a. In this respect, mounting member 34c and inflated air bladder 28 strengthen side rail 22 and outer roof panel 18. In the illustrated embodiment, the roof 12 includes a side air curtain 50 within the cavity 26 and below the air bladder 28.

Also, in the illustrated embodiment, mounting members 44a, 44b are elongated metal plates welded, bolted, or otherwise suitably fastened to the vehicle. It is contemplated that mounting members 44a, 44b can have a variety of suitable constructions that are formed from various materials as desired.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A roof for a vehicle, comprising:
   a pair of opposing side rails;
   a series of cross members extending between said pair of opposing side rails;
   an outer roof panel attached to said opposing side rails and said cross members;
   an inner liner panel attached to said opposing side rails and said cross members;
   said outer roof panel and said inner liner panel defining a cavity with a predetermined height;
   a pneumatic reinforcement system, comprising:
   an air bladder;
   an inflator device inflating said air bladder;
   at least one sensor detecting a crash condition and actuating said inflator device; and
   a rigid mounting member attached to at least one of said series of cross members and housing said air bladder;
   said mounting member and said inflated air bladder strengthening the body structure;
   said air bladder sized for inflating within said cavity up to said predetermined height of said cavity;
   said mounting member and said air bladder strengthening at least one of said outer roof panel, said opposing side rails, and said cross members;
   said inner liner panel separating said cavity from a passenger cabin of the vehicle.

2. The pneumatic reinforcement system recited in claim 1 wherein said air bladder is formed from a neoprene material reinforced with an aramid material.

3. The pneumatic reinforcement system recited in claim 1 wherein said mounting member has at least one housing portion.

4. The roof recited in claim 1 wherein said mounting member attaches said air bladder to at least one of said opposing side rails and said cross members.

5. The roof recited in claim 1 wherein said air bladder is adjacent to at least one of said opposing side rails and said cross members.

6. The roof recited in claim 5 wherein said air bladder extends around a center portion of said outer roof panel defined by said opposing side rails and an adjacent pair of said cross members.

7. A roof for a vehicle, comprising:
   a pair of opposing side rails;
   a series of cross members extending between said pair of opposing side rails;
   an outer roof panel attached to said opposing side rails and said cross members;
   an inner liner panel attached to said opposing side rails and said cross members;
   said outer roof panel and said inner liner panel defining a cavity with a predetermined height;
   a pneumatic reinforcement system, comprising: comprising:
   an air bladder;
   an inflator device inflating said air bladder;

at least one sensor detecting a crash condition and actuating said inflator device; and a rigid mounting member attached to at least one of said series of cross members and housing said air bladder;

said mounting member including a first housing portion and a second housing portion;

said first housing portion and said second housing portion defining at least one chamber containing said air bladder;

said air bladder sized for inflating within said cavity up to said predetermined height of said cavity;

said mounting member and said air bladder strengthening at least one of said outer roof panel, said opposing side rails, and said cross members;

said inner liner panel separating said cavity from a passenger cabin of the vehicle;

said at least one sensor selected from the group consisting of an angular rate sensor and an accelerometer.

8. The pneumatic reinforcement system recited in claim 7 wherein said air bladder is formed from a neoprene material reinforced with an aramid material.

9. The roof recited in claim 7 wherein said first housing portion is attached directly to at least one of said outer roof panel, said opposing side rails, and said cross members.

10. The roof recited in claim 7 wherein said second housing portion is attached directly to said first housing portion.

* * * * *